US010139901B2

United States Patent
Gentilin et al.

(10) Patent No.: US 10,139,901 B2
(45) Date of Patent: Nov. 27, 2018

(54) VIRTUAL REALITY DISTRACTION MONITOR

(71) Applicant: Immersv, Inc., Palo Alto, CA (US)

(72) Inventors: John Charles Gentilin, Castro Valley, CA (US); Mihir Shah, Palo Alto, CA (US); Andrew Raymond Buck, Sunnyvale, CA (US); Jonathan Linsner, San Leandro, CA (US)

(73) Assignee: Immersv, Inc., Emeryville, CA (US)

( * ) Notice: Subject to any disclaimer, the term of this patent is extended or adjusted under 35 U.S.C. 154(b) by 125 days.

(21) Appl. No.: 15/202,375

(22) Filed: Jul. 5, 2016

(65) Prior Publication Data

US 2018/0012408 A1    Jan. 11, 2018

(51) Int. Cl.
 *G09G 5/00*   (2006.01)
 *G06F 3/01*   (2006.01)
 *H04L 29/08*  (2006.01)

(52) U.S. Cl.
 CPC ............ *G06F 3/012* (2013.01); *H04L 67/141* (2013.01); *H04L 67/18* (2013.01)

(58) Field of Classification Search
 None
 See application file for complete search history.

(56) References Cited

U.S. PATENT DOCUMENTS

| | | | |
|---|---|---|---|
| 2008/0033641 A1* | 2/2008 | Medalia | G06F 3/04815 701/533 |
| 2013/0069787 A1* | 3/2013 | Petrou | G02B 27/017 340/573.1 |
| 2015/0310657 A1* | 10/2015 | Eden | G06T 13/80 705/14.45 |
| 2016/0224110 A1* | 8/2016 | Massonneau | G06F 3/012 |
| 2016/0301862 A1* | 10/2016 | Rantakokko | G06F 3/011 |
| 2016/0357017 A1* | 12/2016 | Nishidate | G06F 3/012 |
| 2017/0220308 A1* | 8/2017 | Gibson | G06F 3/0481 |
| 2017/0269685 A1* | 9/2017 | Marks | G06F 3/013 |

\* cited by examiner

*Primary Examiner* — Frank Chen
(74) *Attorney, Agent, or Firm* — Elliot H. Karlin; Hickman Palermo Becker Bingham LLP

(57) ABSTRACT

A method and apparatus for tracking distractions in a virtual reality environment is provided. In an embodiment, data identifying an area of interest is stored with a particular virtual reality application on a client computing device. The client computing device tracks a point of focus during execution of the application on the client computing device. In response to determining that the point of focus differs from the area of interest, the client computing device executes an application event.

18 Claims, 7 Drawing Sheets

VIRTUAL REALITY DISTRACTION MONITOR

FIELD OF THE DISCLOSURE

The present disclosure relates to the field of computer-based virtual reality systems and applications. Specifically, the present disclosure relates to digitally programmed logic for identifying distractions during execution of a virtual reality application through head-mounted displays and other digital display devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer-based virtual reality devices provide a unique immersive experience for a user. Through virtual reality applications, a user is capable of experiencing a fully modeled three dimensional world of a game or movie as if the user was actually in the game or movie. Virtual reality computer systems typically comprise a programmed digital computer coupled, directly or indirectly via networks, to a display device that is capable of rendering a virtual 3D world or environment on a two-dimensional display panel. In some cases the display device may be a head mounted display (HMD) consisting of a wearable apparatus having one or more displays that can be positioned close to the eyes of the user.

HMDs provide an immersive virtual reality experience for a user. Immersion in the visual experience is achieved in part because the HMD displays video across the entire frontal and peripheral visual field of the user so that the real external environment is not seen. An HMD creates the immersive feel by allowing an application publisher to provide a hands free immersion into video games or 3D filmed content. By tracking the movement of the headset in three dimensions through one or more motion detecting chips, an HMD is capable of displaying the 3D environment in a manner that synchronizes with the motion of a person's head. Thus, as a person turns or rotates their head, the headset is capable of recognizing the motion and displaying to the user a corresponding portion of the virtual reality environment.

While virtual reality applications create a more immersive experience for a user, it is easy for a user to become distracted in a virtual reality application. The full environment offered by the virtual reality application allows the user to investigate the entirety of the environment. Thus, at any given moment in the execution of a virtual reality application, a user may be looking in any direction.

Many virtual reality applications have specific areas that the application publisher wants the user to see. The specific areas may relate to events that are occurring in real time, such as action scenes, or to a purpose of the virtual reality application, such as displaying videos in a virtual theater. If the user of the virtual reality application is not looking in the correct direction at the correct time, it is possible that the user will miss an important part of the application without knowing it was there. Additionally, distraction in a virtual reality application is often associated with disinterest or boredom. If a player of an action game is looking around the environment during a major action scene, it is a sign that the major action scene is not engaging the user.

When an application publisher creates a virtual reality application, the application publisher has no way of knowing whether users will focus on particular aspects of the virtual world at the right times. Thus, an application publisher has no way of knowing if putting time and resources into building a particular part of a virtual reality environment will result in a significant improvement to the user experience. Additionally, when an application publisher updates an existing application, the application publisher does so without knowing whether users are generally focusing on specific parts of the application or whether boredom, disinterest, other elements of the environment, or other outside factors are causing the users to miss the specific parts of the application.

In addition to not knowing when a user is becoming distracted, once a user becomes distracted or disinterested in the environment, the application publisher has no way of rectifying the situation by refocusing the user on the interesting parts of the environment. Even if the application publisher were able to collect feedback from users who become distracted in games, the application publisher is still unable to redirect the initial distracted user's focus so that the initial user does not miss the events in the first place. While the application publisher may modify the application for future users, the application publisher may still lose the opportunity to show the distracted users the missed important parts of the application.

Thus, there is a need for a method of determining when users become distracted in applications. Additionally, there is a need for a method of redirecting the focus of distracted users that are about to miss out on the full experience of a particular application.

SUMMARY

The appended claims may serve to summarize the present disclosure.

DETAILED DESCRIPTION

Figure 1:
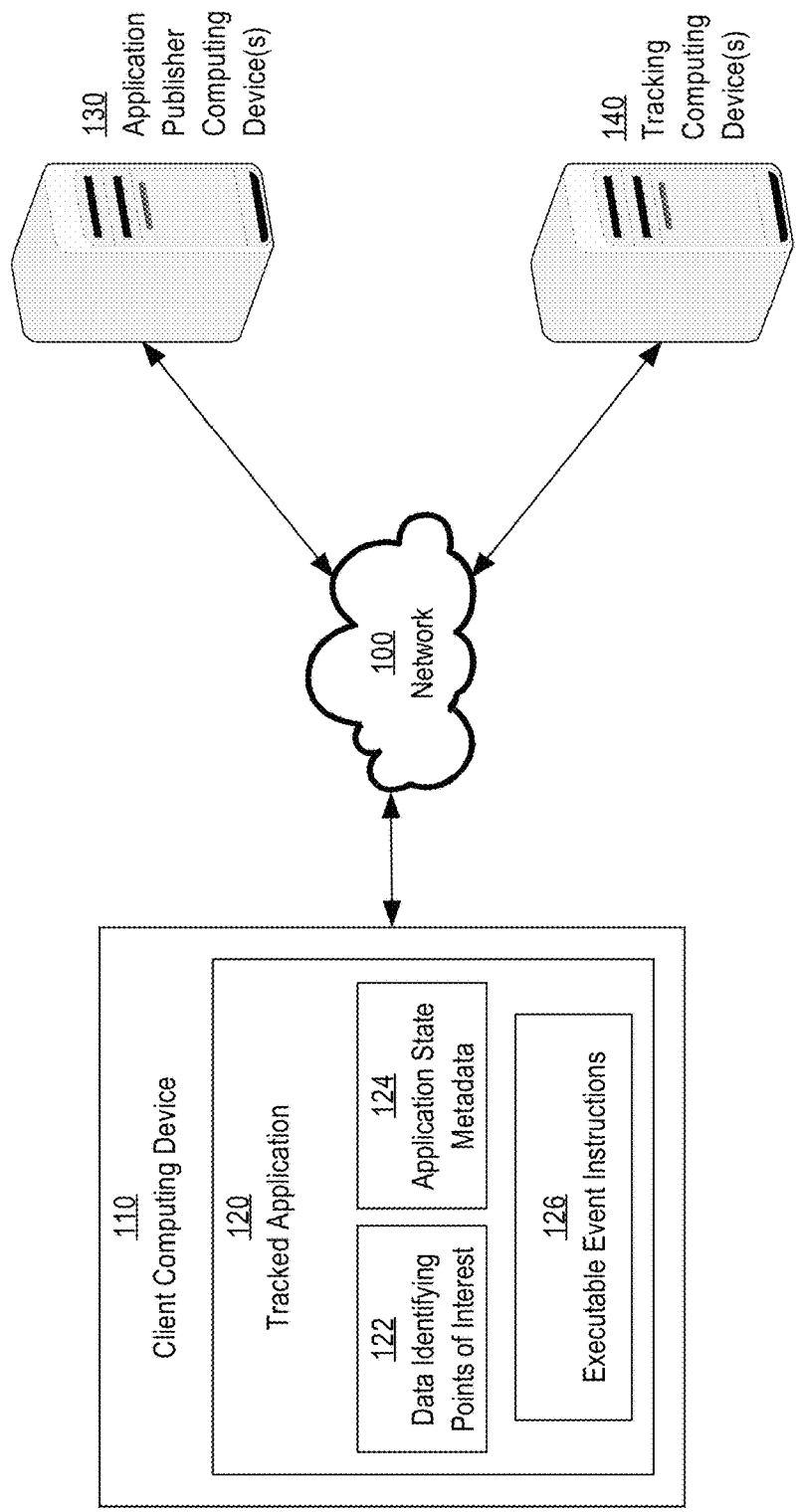
FIG. 1 illustrates an example network upon which embodiments may be implemented.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. STRUCTURAL OVERVIEW
3. DISTRACTION MONITOR
3.1. TRACKING POINTS OF FOCUS
3.2. AREAS OF INTEREST
3.3. APPLICATION EVENTS
3.4. TRACKING COMPUTING DEVICE PERSPECTIVE
4. APPLICATION STATE
5. USER STATE
6. ALTER APPLICATION
7. HEAT MAPS AND REVERSE HEAT MAPS
8. SIMILAR APPLICATIONS
9. DISTRACTION SCORE
10. HARDWARE OVERVIEW

1. General Overview

Aspects of the disclosure generally relate to computer implemented techniques for tracking a point of focus in a virtual reality application and identifying distractions in the virtual reality application. In an embodiment, data identifying one or more areas of interest in a virtual reality application is stored on a client computing device with the virtual reality application. The client computing device tracks a point of execution while the application is executing on the client computing device. In response to determining that the point of focus is different than the area of interest, the application may store data identifying a distraction, execute an event within the application, and/or send data to a tracking computing device identifying a distraction.

In an embodiment a computer-implemented method comprises storing on a client computing device, with a particular digital graphical virtual reality application, digital data identifying one or more particular areas of interest within the particular digital graphical virtual reality application; tracking, through the particular digital graphical virtual reality application executing on the client computing device, a point of focus of a video display of the client computing device executing the particular digital graphical virtual reality application; determining that the point of focus for the particular user of the particular digital graphical virtual reality application is different than any of the one or more particular areas of interest; in response to the determining, causing execution of an application event through the particular digital graphical virtual reality application or a client computing device event through the client computing device.

In an embodiment, a computer-implemented method comprises receiving, at a server computer, a particular digital graphical virtual reality application; generating, at the server computer, instructions which, when executed by a client computing device, cause: tracking, through the particular digital graphical virtual reality application executing on the client computing device, a point of focus of a video display of the client computing device executing the particular digital graphical virtual reality application; sending, to the server computer, first digital data identifying the point of focus of the video display at one or more times during execution of the particular digital graphical virtual reality application.

In an embodiment, a computer-implemented method comprises executing, on a head mounted display system, a particular virtual reality application; while executing the particular virtual reality application, receiving inertial measurement unit data from the inertial measurement unit; based on the inertial measurement unit data, computing a distraction score.

2. Structural Overview

FIG. 1 illustrates an example network upon which embodiments may be implemented.

FIG. 1 comprises client computing device 110, application publisher computing device(s) 130 and tracking computing device(s) 140, which are communicatively coupled over network 100.

Network 100 may be implemented by any medium or mechanism that provides for the exchange of data between the various elements of FIG. 1. Examples of network 100 include, without limitation, one or more networks, such as one or more Local Area Networks (LANs), one or more Wide Area Networks (WANs), one or more Ethernets or the Internet, or one or more terrestrial, satellite or wireless links. For purposes of illustrating a clear example, network 100 is shown as a single element, but in practice network 100 may comprise one or more local area networks, wide area networks, and/or internetworks. The various elements of FIG. 1 may also have direct (wired or wireless) communications links, depending upon a particular implementation.

Each of client computing device 110, application publisher computing device(s) 130 and tracking computing device(s) 140 may be implemented using a server-class computer or other computer having one or more processor cores, co-processors, or other computers. FIG. 1 depicts client computing device 110, application publisher computing device(s) 130 and tracking computing device(s) 140 as distinct elements for the purpose of illustrating a clear example. However, in other embodiments more or less server computers may accomplish the functions described herein. For example, tracking computing device(s) 140 may interact with a plurality of application publisher computing devices 130 and/or a plurality of client computing devices 110. As another example, a single server computer may perform the functions of application publisher computing device(s) 130 and tracking computing device(s) 140. Additionally, application publisher computing device(s) 130 may be one or more of a smart phone, PDA, tablet computing device, laptop computer, desktop computer, workstation, or any other computing device capable of transmitting and receiving information and performing the functions described herein.

Client computing device 110 may be any computing device that is capable of displaying a virtual reality environment and interacting over a network with tracking computing device(s) 140. Client computing device may be a smart phone, personal computer, tablet computing device, PDA, laptop, or any other computing device capable of transmitting and receiving information and performing the functions described herein. In an embodiment, client computing device is a head mounted display for displaying virtual reality applications. Additionally and/or alternatively, client computing device may be communicatively coupled to a head mounted display for displaying virtual reality applications. For example, a head mounted display may be communicatively coupled to a personal computer which performs the receiving and transmitting functions described herein and further causes displaying, through the head mounted display, a virtual reality application.

In an embodiment, client computing device 110 executes a tracked application 120, which may be a virtual reality display, virtual reality game, modified reality display, modified reality game, 360 degree video, or 3D video, as some examples. Client computing device 110 may receive tracked application 120 from application publisher computing device(s) 130 over network 100. Additionally and/or alternatively, tracked application 120 may execute on client computing device 110 from one or more computer readable media storing instructions which, when executed by client computing device 110, cause client computing device 110 to execute the tracked application 120.

Tracked application 120 may contain data identifying points of interest 122, application state metadata 124, and executable event instructions 126. Data identifying points of interest 122 may be stored with tracked application 120 in order to identify digital locations and/or times in the tracked application which have been identified by application publisher computing device(s) 130 or tracking computing device(s) 140 as areas of interest. Application state metadata 124 comprises data identifying a time in the application, one or more prior actions performed by a user within the application, one or more prior events that occurred within the application, and any saved statistics. For example, application state metadata 124 in a game may include a character's location, health, items, and upgrades as well as the prior levels played and prior events that have occurred. Executable event instructions 126 comprise instructions which, when executed by the client computing device, cause the client computing device to execute an event in the tracked application.

Application publisher computing device(s) 130 is communicatively coupled to tracking computing device(s) 140 via one or more networks, which may be implemented in the manner previously described for network 100. Application publisher computing device(s) 130 may be configured to send data identifying points of interest in an application to tracking computing device(s). Application publisher computing device(s) may be further configured to provide tracked application 120 to client computing device 110 over network 100.

Tracking computing device(s) 140 is communicatively coupled to application publisher computing device(s) 130 and client computing device(s) 110. Tracking computing device(s) 140 may be configured to generate instructions that track a point of focus within a received application. Tracking computing device(s) 140 may also be configured to perform data analytics to identify points of interest, identify areas of distraction, and identify user states. In an embodiment, tracking computing device(s) is programmed or configured to generate instructions which, when executed by a client computing device, cause execution of an application event in response to determining that a point of focus differs from a point of interest.

Figure 2:
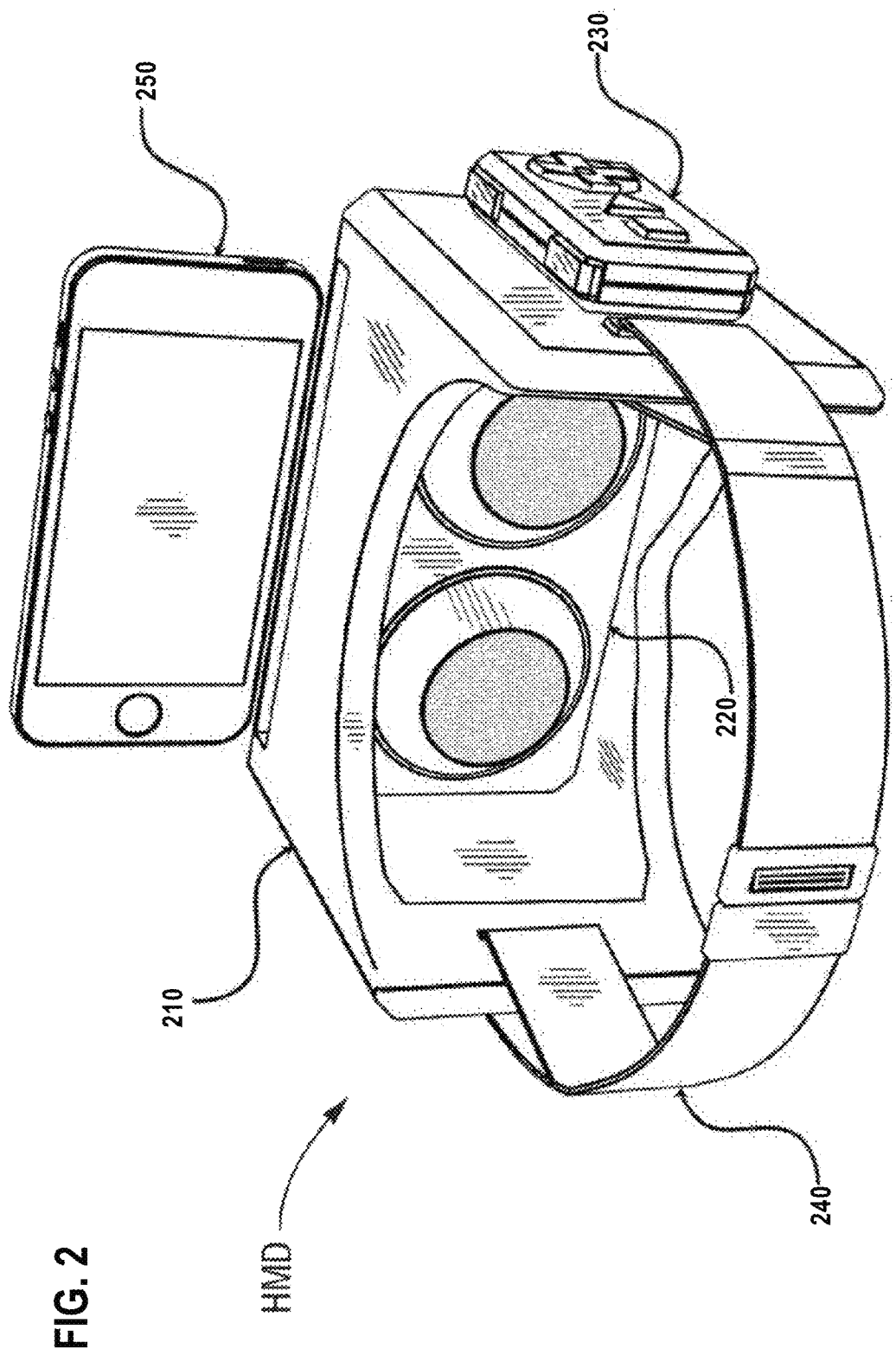
FIG. 2 illustrates an example of a head mounted display for displaying virtual reality applications.

FIG. 2 illustrates an example of a head mounted display for displaying virtual reality applications.

The device of FIG. 2 comprises a main body 210 which may be fitted with a lens assembly 220, a strap 240 which securely attaches the main body to the user's head, a re-attachable remote controller 230, and an external mobile computing device 250 to be secured in the main body. The main body 210 as disclosed herein may be easily adapted to fit any of a number of mobile computing device 250 shapes and sizes, such as, but not limited to, the SAMSUNG GALAXY 4, the IPHONE 5, and the HTC ONE. As noted, strap 240 in FIG. 2 may be used to securely attach the main body to the user's head, but other or additional means and methods may be used. For example, main body 210 could be incorporated into a helmet-like device which is secured to the top a user's head without a strap. The device may also include other means of interacting with the mobile computing device within such as one or more levers coupled to a stylus which is configured to be incident on a touch screen of the mobile computing device or one or more holes in the device through which a user may interact with the mobile computing device.

External mobile computing device 250 may include a central processing unit (CPU), a screen, and wireless communication functionality. External mobile computing device 250 may be capable of running applications for use with the head mounted device. External mobile computing device 250 may incorporate one or more motion sensors, for example, gyroscopes, gravitometers, magnetometers, accelerometers, and similar sensors, which may be relied upon, at least in part, in determining the orientation and movement of the overall head mounted display. In some embodiments, one or more additional sensors are located on main body 210, such as light or pressure sensors which are used to determine whether the head mounted display is being worn by a user.

Lens assembly 220 may be configured to allow three dimensional display through a particular screen. For example, each lens of lens assembly 220 may be configured to focus on a different portion of the mobile computing device screen. The mobile computing device 250 may display a stereoscopic image by displaying a left portion of a stereoscopic image on a left portion of the screen of the mobile computing device 250 and a right portion of the stereoscopic image on a right portion of the screen of the mobile computing device. By displaying slightly different images to each eye, the device allows creation and display of virtual reality, modified reality, 360 degree video, and 3D video.

3. Distraction Monitor

Figure 3:
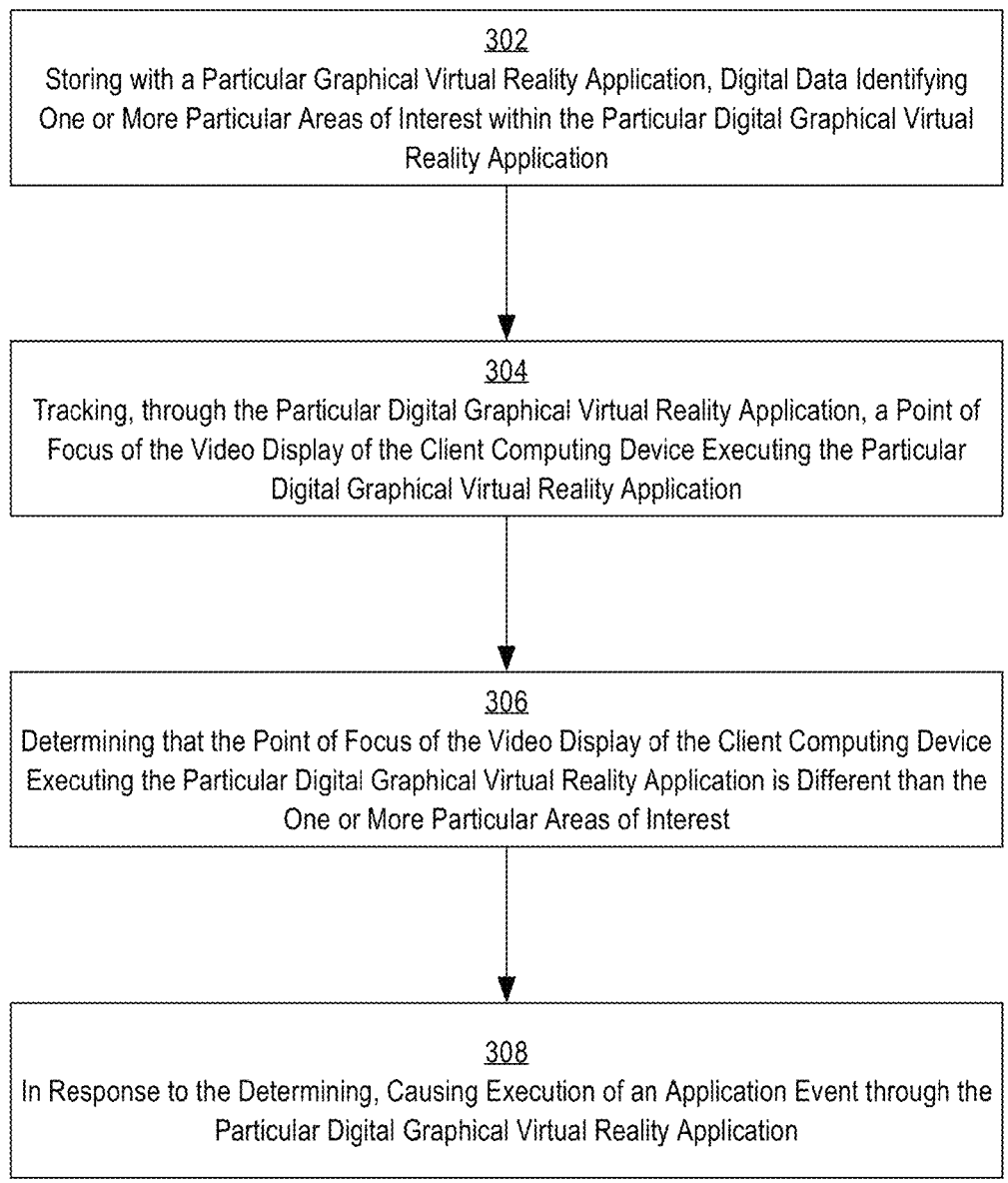
FIG. 3 illustrates a flow diagram illustrating an example method of monitoring distraction within a particular application executing on a client computing device.

FIG. 3 illustrates a flow diagram illustrating an example method of monitoring distraction within a particular application executing on a client computing device. FIG. 3, and each other flow diagram in this disclosure, is intended as an example of a programmable algorithm that may be implemented using one or more of the application publisher computing device(s) 130 and tracking computing device(s) 140 under control of one or more computer programs that are configured to execute the operations that are described in connection with the flow diagrams. The programs may be created using any computer program development environment that is now known or contemplated at the time of this writing, including but not limited to JAVA, C++, OBJECTIVE-C, C, C#, PASCAL, alone or in combination with scripting languages such as PERL, JAVASCRIPT and the like. The programs, alone or in combination, may contain source language instructions, pseudo-code, and/or machine language instructions which when executed cause performing a computer-implemented method comprising:

storing on a client computing device, with a particular digital graphical virtual reality application, digital data identifying one or more particular areas of interest within the particular digital graphical virtual reality application;

tracking, through the particular digital graphical virtual reality application executing on the client computing device, a point of focus of a video display of the client computing device executing the particular digital graphical virtual reality application;

determining that the point of focus of the video display of the client computing device executing the particular digital graphical virtual reality application is different than any of the one or more particular areas of interest;

in response to the determining, causing execution of an application event through the particular digital graphical virtual reality application or a client computing device event through the client computing device;

wherein the application event comprises storing application metadata associated with a current state of the particular digital graphical virtual reality application;

wherein the application metadata identifies one or more of a virtual location of the particular user, a time within the application, one or more previous events within the application, or one or more prior actions of a particular user in the application;

wherein the digital data identifying one or more particular areas of interest is generated automatically by a processor of a server computer from heat map data that has been received from a plurality of client computing devices and which identifies points of focus of video displays of the plurality of client computing devices;

tracking the point of focus of the video display at a first point of time in a reference digital graphical virtual reality application;

tracking the point of focus of the video display at a second point of time in the particular digital graphical virtual reality application;

identifying the second point of time as similar to the first point of time;

determining that the point of focus of the video display of the client computing device executing the particular digital graphical virtual reality application is different than the one or more particular areas of interest by determining that the point of focus of the video display at the second point of time is different than the point of focus of the video display at the first point of time;

wherein the reference digital graphical virtual reality application is a different application than the particular digital graphical virtual reality application.

wherein the application event comprises an audiovisual event in the particular digital graphical virtual reality application to attract the particular user to shift the point of focus to the particular area of interest;

identifying a plurality of times in which the point of focus of the video display is different from a stored area of interest;

in response to the identifying, identifying a state of the particular user;

in response to identifying the state of the particular user, modifying execution of the particular digital graphical virtual reality application based, at least in part, on the state of the particular user;

wherein the client computing device comprises a head mounted display;

wherein the client computing device event comprises the client computing device vibrating, playing a particular sound, or altering a visual display of the client computing device;

wherein the point of focus of the video display changes based, at least in part, on the client computing device detecting motion of the client computing device;

receiving, at a server computer, a particular digital graphical virtual reality application;

generating, at the server computer, instructions which, when executed by a client computing device, cause:
tracking, through the particular digital graphical virtual reality application executing on the client computing device, a point of focus of a video display of the client computing device executing the particular digital graphical virtual reality application;
sending, to the server computer, first digital data identifying the point of focus of the video display at one or more times during execution of the particular digital graphical virtual reality application;

receiving, from a plurality of client computing devices, second digital data identifying points of focus for a plurality of users of the particular digital graphical virtual reality application at the one or more times;

generating, from the second digital data, one or more heat maps for the particular digital graphical virtual reality application at the one or more times;

identifying, from the one or more heat maps, an area of interest for the particular digital graphical virtual reality application;

generating instructions which, when executed by a particular client computing device, cause:
tracking, through the particular digital graphical virtual reality application executing on the client computing device, a point of focus of a video display of the particular client computing device executing the particular digital graphical virtual reality application;
determining, at a particular time of the one or more times, that the point of focus of the video display is different from the area of interest;
in response to determining, causing execution of an application event through the particular digital graphical virtual reality application or a client computing device event through the client computing device;

receiving, at the server computer, second digital data identifying an area of interest for the particular digital graphical virtual reality application;

wherein the instructions which, when executed by a client computing device, further cause:
determining that, at the one or more times during execution of the particular digital graphical virtual reality application, the point of the video display is different than the area of interest for the particular digital graphical virtual reality application;
sending, to the server computer, the first digital data in response to the determining.

receiving, at the server computer, along with the first digital data, third digital data identifying an application state of the particular digital graphical virtual reality application at the one or more times;

determining, based, at least in part, on the third digital data, a state of the user;

wherein the application state comprises one or more of a virtual location of the user, a time within the application, one or more previous events within the application, or one or more prior actions of the user;

receiving, from a plurality of client computing devices, third digital data identifying points of focus for a plurality of users of the particular digital graphical virtual reality application at the one or more times;

generating, based on the third digital data, a reverse heat map identifying variations of points of focus from the area of interest.

receiving, at the server computer, second digital data identifying an area of interest for the particular digital graphical virtual reality application;

receiving, at the server computer from a plurality of client computing devices, third digital data identifying points of focus of video displays of the plurality of client computing devices executing the particular digital graphical virtual reality application;

computing, based on the second digital data and the third digital data, a relative length of focus on the area of interest of the video displays of the plurality of client computing devices executing the particular digital graphical virtual reality application.

3.1. Areas of Interest

At step 302, digital data identifying one or more particular areas of interest within a particular digital graphical virtual reality application are stored with the particular digital graphical virtual reality application. In an embodiment, an application publisher identifies a particular area of interest for one or more times within an application. Additionally and/or alternatively, areas of interest may be identified by a tracking computing device based on tracked points of focus in the application from a plurality of client computing devices.

In an embodiment, an area of interest is a generalized point during execution of a virtual reality application. For example, in a virtual reality application that features a movie theater an area of interest may comprise the movie screen. As another example, in a driving game an area of interest may be the road ahead of the car. The area of interest may also be tied to specific events in the virtual reality application. For example, if a character is making an entrance in a virtual reality application an area of interest may be the area surrounding the entering character.

3.2. Tracking Points of Focus

At step 304, a point of focus of a video display of the client computing device executing the virtual reality application is tracked. For example, instructions may be insert into the virtual reality application that cause the virtual reality application to identify a focus point of the display during execution of the virtual reality application and to store data identifying the point of focus. The data identifying the point of focus may comprise coordinates in a three dimensional environment, an identifier of a portion of the environment, or an identifier of whether the point of focus matches the area of interest. In some embodiments, the point of focus is tracked at all points during execution of the application. In other embodiments, the point of focus is only tracked at specific times within the execution of the application, such as times that overlap with areas of interest. For example, if an area of interest coincides with an entrance of a character the point of focus may be tracked during the entrance of the character.

In an embodiment, the point of focus of the video display of the client computing device changes based on movement of the client computing device. For example, a head mounted display may comprise an inertial measurement unit comprising one or more accelerometers, gravimeters, magnetometers, gyroscopes, and/or other sensors. The inertial measurement unit may be configured to measure three dimensional acceleration, velocity, magnetic field, and/or angular rate of change. Based on the measurements, client computing device 110 may produce data describing the position, acceleration, and/or angular rate of change of client computing device 110. A virtual reality application may be configured to adjust the point of focus of the display of client computing device 110 based on measured movement from the inertial measurement unit. In this manner, a virtual reality application can simulate three dimensional space by linking movement of the display to movement of the client computing device.

Figure 5:
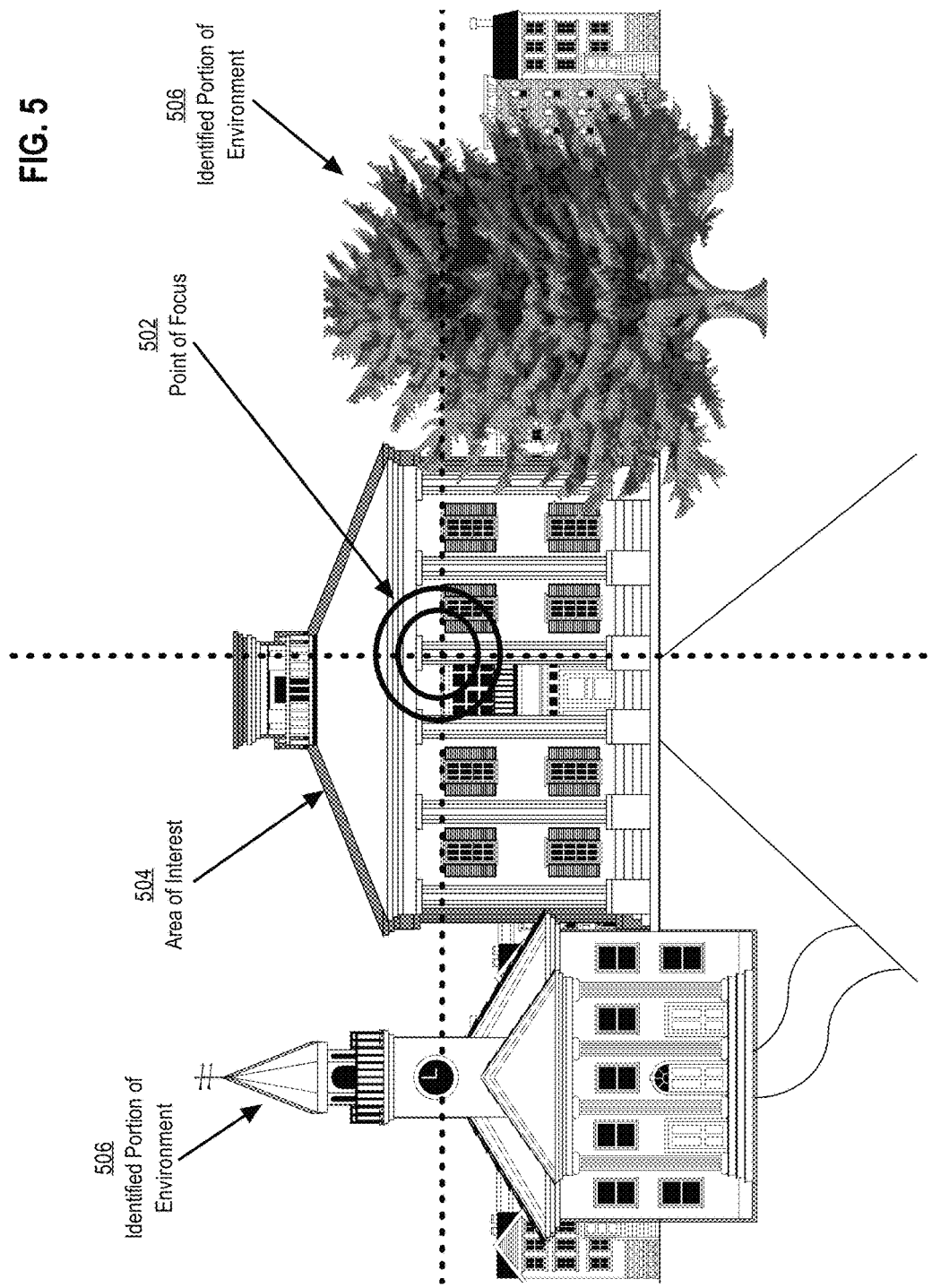
FIG. 5 depicts an example video display of a client computing device with a virtual reality environment and a point of focus.

FIG. 5 depicts an example video display of a client computing device with a virtual reality environment and a point of focus. The video display of FIG. 5 includes point of focus 502, area of interest 504, and identified portions of environment 506. Point of focus 502 is depicted using crosshairs, but in an embodiment a depiction of point of focus 502 is not displayed on the client computing device.

Thus, while the point of focus may be identified by the client computing device as the location depicted in FIG. 5, the client computing device may display only the buildings, roads, and tree. Area of interest 504 is an identified location at one or more points in time. For example, at the particular point in time in FIG. 5, area of interest 504 is the central building. Area of interest 504 may change depending on other events in the application. For example, if the tree catches fire while the user location moves closer to the central building, area of interest 504 may switch to the burning tree.

Identified portions of environment 506 are objects or locations within the virtual reality application that have been identified. For example, while area of interest 504 is the central building in FIG. 5, the building to the left and the tree to the right have been identified as other portions of the environment. The building to the left may be identified as "The Church" while the tree to the right may be identified as "Yew Berry Tree." In some embodiments, the identified portions of environment 506 are used to define the point of focus 502 when the point of focus 502 is not centered on area of interest 504. For example, in FIG. 5 the point of focus at any given time may be identified as either matching the area of interest, the church, the yew berry tree, or other location.

While FIG. 5 depicts objects as areas of interest and identified portions of the environment, in an embodiment points of interest are identified using coordinates. For example, area of interest 504 may be defined in virtual reality environment using Cartesian coordinates or polar coordinates. Based on a digital user location in the virtual reality environment and a direction, the client computing device may determine whether a vector defining point of focus 502 overlaps with coordinates that define the area of interest 504. Additionally and/or alternatively, the point of focus may be larger than a single point. For example, the point of focus may be the entire display of the screen or a portion of the entire display that is centered on a central point within the display.

At step 306, the point of focus for the video display of the client computing device is determined to be different than the one or more particular areas of interest. The determination that the point of focus differs from the one or more particular areas of interest may be referred to herein as the determination of a distraction. For example, in FIG. 5, if the area of interest was the yew berry tree, the client computing device would determine that point of focus 502 does not overlap with the area of interest. In some embodiments, the determination may occur further in response to a particular event within the application. For example, the building in the center of the screen in FIG. 5 may become the area of interest only when the digital user location is within a particular distance from the building. After the building becomes the area of interest, the client computing device may determine whether the point of focus overlaps with the area of interest.

In an embodiment, determining whether the point of focus is different than the area of interest comprises determining if the difference in focus lasts longer than a specified period of time. For example, in a virtual reality driving game, the area of interest may be the road ahead of the driver. The application publisher may identify a period of time, such as two seconds, that the point of focus may differ from the area of interest before a determination is made. Thus, the client computing device may not make a determination that the point of focus differs from the road if the driver quickly glances at the side mirrors or at passing signs. On the other hand, if the point of focus is on a nearby car for longer than two seconds, the client computing device may determine that the point of focus is different than the area of interest.

In an embodiment, determining whether the point of focus is different than the area of interest comprises determining if a particular portion of the area of interest is within the point of focus. For example, the point of focus may be the entire display or a central portion of the display. The client computing device may determine that the point of focus is the same as the area of interest if there is any overlap between the portion of the display and the area of interest. Additionally and/or alternatively, the client computing device may determine if a particular percentage of the area of interest is within the point of focus. For example, if the area of interest is a digital movie screen playing a video, the client computing device may determine that the area of interest is different than the point of focus if less than 80% of the movie screen is within the display of the client computing device.

In an embodiment, an application may make use of a combination of the above described methods for tracking a point of focus in an application and determining whether the point of focus is different from an area of interest. For example, a first area of interest may be a building in the distance and the application may determine whether the central point of the display does not overlap with the building for longer than two seconds. A second area of interest may be a character that moves through the environment and the application may determine whether at any point in time the character is not in the display. By allowing an application publisher to select different types of points of focus and different types of areas of interest, tracking computing device(s) 140 allows the application publisher to mold the tracking system to a unique application. For example, a particular application may have some events that may be diminished if the display fails to cover portions of the event for any period of time. The same application has some events in which there is a central focus, but the experience would not be diminished if the display shifted from one location to another during the event.

3.3. Application Events

At step 308, in response to determining that the point of focus is different than the one or more particular areas of interest, an application event is executed through the particular digital graphical virtual reality application or a client computing device event is executed through the client computing device. For example, client computing device 110 may execute executable event instructions 126 in response to determining that the point of focus is different than the one or more particular areas of interest. In some embodiments, executable event instructions include different instructions based on the point of interest and/or application metadata. For example, application publisher computing device(s) 130 may identify different events for different points of interest throughout the application.

In an embodiment, the application event comprises identifying a point of focus in the application and sending data to tracking computing device(s) 140 indicating a distraction. For example, in the driving game discussed above, each time the display does not include the road for more than two seconds, the application may send data to tracking computing device(s) 140 indicating a distraction. In some embodiments, data is stored identifying a distraction and is sent to tracking computing device(s) 140 at a designated time, such as at the end of a level or when client computing device 110 connects to tracking computing device(s) 140 over one or more networks. By storing the data and sending it in batches, the client computing device may continue to track points of focus while offline. Additionally, the performance of client computing device 110 may be improved by decreasing the number of messages sent to tracking computing device(s) 140 during execution of the application.

Sending data to tracking computing device(s) 140 may additionally comprise sending data identifying the actual point of focus during the distraction. For example, the application may include labels for objects that are not the area of interest. In the example of FIG. 5, the virtual reality application may include labels for the yew berry tree and the church. If the point of focus during the distraction is on or about the yew berry tree, client computing device 110 may send data to tracking computing device(s) 140 identifying the occurrence of the distraction and the yew berry tree as the point of focus during the distraction. Data identifying the actual point of focus may also include coordinates and/or vectors. For example, the actual point of focus may be defined by one or more digital locations associated with the display and corresponding vectors in Cartesian or spherical coordinates identifying a direction of focus from the digital location.

In an embodiment, the application event comprises simple visual or audio cues that are used to direct focus of the user of the client computing device to the area of interest. Examples of a visual cue may include: arrows appear at the top of the screen and point towards the area of interest; a wall of the display changes color to direct focus in the direction of the wall; and/or one or more portions of the display go out of focus to direct the user away from the distraction. An audio cue may include causing the client computing device to emit a sound to direct focus of the user, such as by playing a sound through one speaker of a stereophonic client computing device. For example, if the area of interest is a character to the left of the digital location of the client computing device, the application may have the character call out to the user by playing the voice of the character through the left speaker.

In an embodiment, the application event comprises executable events within the application. For example, a video application may pause the currently playing video in response to a distraction and only begin playing the video again when the point of focus overlaps with the area of interest. In the driving game discussed above, the game may execute instructions that force a collision between the car and a guard rail in response to identifying a distraction. Additionally and/or alternatively, the game may execute instructions that cause appearance of an obstacle, such as a different car swerving in front of the driver. As another example, a game may create more enemies in response to a determination of a distraction. Executable events may be generated by the application publisher and tied to the identification of a distraction at different points within the application. For example, an application publisher may designate a different executable event for each level of a game and/or for each different area of interest.

In an embodiment, the application publisher designates multiple possible events to occur in response to a distraction. For example, executable events may include an explosion in the direction of the area of interest, the spawning of an enemy in the area of interest, a shout from the direction of the area of interest, etc. In response to detecting a distraction, the client computing device may pseudo-randomly select one or more of the executable events to refocus the attention of the user. By allowing selection from multiple possible executable events, the application is able to generate a different experience for each user and to more effectively focus a particular user who may become used to seeing a particular executable event in response to being distracted.

3.4. Tracking Computing Device Perspective

Figure 4:
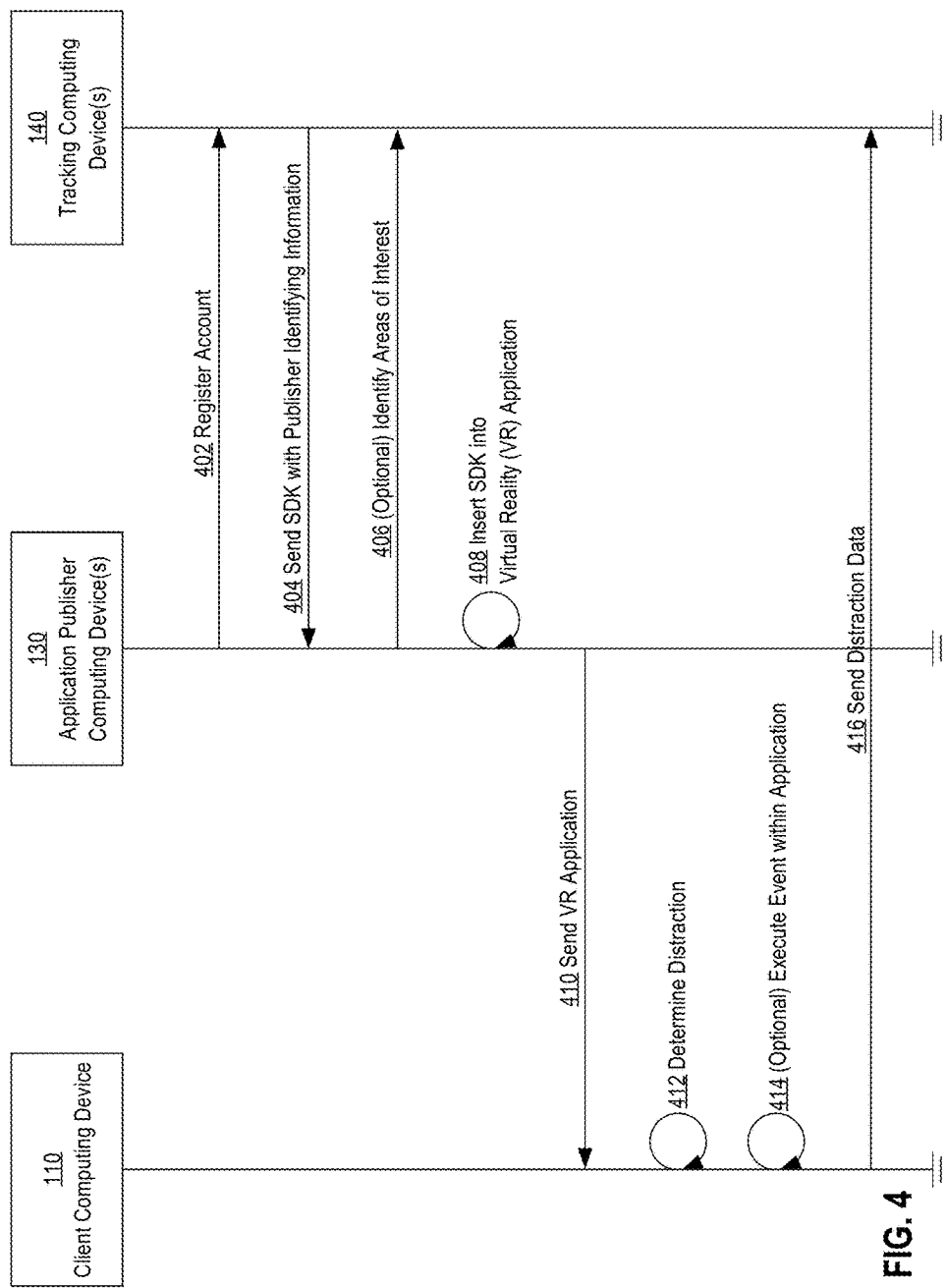
FIG. 4 illustrates a flow diagram illustrating an example method of generating instructions to track focus within a particular application.

FIG. 4 illustrates a flow diagram illustrating an example method of generating instructions to track focus within a particular application.

At step 402, application publisher computing device(s) 130 registers an account with tracking computing device(s) 140. For example, an application publisher may generate a user account with tracking computing device(s) 140 through an application or website provided by tracking computing device(s) 140.

At step 404, tracking computing device(s) 140 sends a software development kit with publisher identifying information, such as an application ID and placement ID, to application publisher computing device(s) 130. The software development kit may include tools for identifying areas of interest within an application including general areas of interest, such as the road in the driving game, and specific areas of interest, such as the building in FIG. 5 which is only an area of interest at a certain point within the application. The software development kit may also include tools for identifying executable events, executing events within the application, and/or sending distraction information to tracking computing device(s) 140. In an embodiment, an application ID and a placement ID are generated and sent to application publisher computing device(s) 130 in response to a request for an application ID and a placement ID. Additionally, tracking computing device(s) 140 may store data identifying that the application ID and placement ID are currently in use.

At step 406, application publisher computing device(s) 130 optionally identifies areas of interest to tracking computing device(s) 140. For example, application publisher computing device(s) may send data to tracking computing device(s) 140 identifying one or more areas of interest within the application. The areas of interest may be identified using the application ID to identify the particular application and a placement ID to identify a particular area of interest. Application publisher computing device(s) 130 may also identify other areas within the particular application that may serve as points of distraction. For example, data identifying other points of the environment surrounding the area of interest may be sent along with the application ID and placement ID.

At step 408, application publisher computing device(s) 130 inserts a software development kit (SDK) into a virtual reality application. For example, application publisher computing device(s) 130 may insert, into a particular application, a virtual reality tracking library generated by tracking computing device(s) 140. The virtual reality tracking library may be an SDK configured to detect distractions using the methods described above, store data identifying the distraction, execute application events created by application publisher computing device(s) 130, and/or send data to tracking computing device(s) 140 identifying the distraction. Data identifying the distraction may also include a length of time in which the point of focus overlapped with the area of interest before the distraction. In an embodiment, the tracking library causes data identifying distractions to be stored on client computing device 110 and sent to tracking computing device(s) 140 in batches. In some embodiments, data identifying the point of focus during execution of the application or during specific moments within the application are additionally stored and sent to tracking computing device(s) 140 regardless of whether a distraction has been identified.

At step 410, application publisher computing device(s) 130 sends the VR application to client computing device 110. Sending the VR application to client computing device 110 may comprise placing the application on a platform application store, such as a marketplace application, for download onto client computing device 110. The VR application may include instructions for sending data to tracking computing device(s) 140 to be associated with a particular placement ID and application ID. The VR application may further include instructions for identifying a state of the application and sending the application state data to tracking computing device(s) 140 with the tracking data associated with the particular placement ID and application ID.

At step 412, client computing device 110 determines a distraction within the VR application. For example, client computing device 110 may play a three dimensional movie or initiate a virtual reality video game. Within the application, client computing device 110 may identify points in which the point of focus does not overlap with an area of interest using the methods described herein.

At step 414, client computing device 110 optionally executes an application event within the application. The application event may include an audio or visual alteration within the application. Additionally, the application event may include an alteration in the artificial intelligence of one or more characters in the application or occurrence of an action within the application. For example, certain enemies may be configured to become more aggressive in response to a distraction. In some embodiments, a client computing device event may be executed in response to the distraction. Client computing device events include events that occur independent of the execution of the virtual reality application. For example, a portion of the client computing device may vibrate and/or create a sound in response to the distraction.

At step 416, distraction data is sent to tracking computing device(s) 140. The distraction data may be sent with the application ID and placement ID in order to identify the application and the point in the application in which the distraction occurred. The distraction data may also include data indicating an amount of time in which focus was on the area of interest, an amount of time in which focus was not on the area of interest, locations of one or more other points of focus during the distraction, and application state data. Tracking computing device(s) 140 may store the distraction data and use the distraction data to perform analytics describing locations in the application in which distractions occur with higher frequencies. Additionally, tracking computing device(s) 140 may use distraction data to detect a user state associated with client computing device 110.

4. Application State

In an embodiment, in addition to data identifying the distractions, client computing device 110 may send application state data to tracking computing device(s) 140 in association with each distraction. Application state data may comprise a snapshot of the application which uses application metadata to identify where in the execution of the application the distraction occurred. For example, in an application which includes a movie theater playing different videos, the application state may identify how long the application has been running videos, how many videos have been played, which video was playing when the distraction occurred, how long had the present video been playing, what actions were taken in the application before the distraction, and what actions were taken in the application after the distraction. Application state data may also include data from other sessions of the application. For example, in the movie application, application state data may identify how many times the application has been run in the past, how long the application ran each time in the past before being terminated, how long the application ran each time in the past before a distraction occurred, and past actions taken in the application during prior sessions.

The application state may include the game state of a virtual reality game. A game state may include a location of the digital character in the game, locations of other elements such as characters and movable objects, a level of the game, prior actions taken within the game, current character health, average movement speed, average turn speed, and customizable elements such as character and item skins. The game state may also include session specific data such as how long the current session has been active and what actions have been taken within the current session. Game state data may also include average session data, such as how long on average a game is played on the client computing device and how many different types of actions are taken on average in a game session. For example, average session data may include data identifying how many levels a player generally plays through in a session or how many enemies a player generally defeats during a game session.

In an embodiment, the application publisher selects which types of application state data to send to tracking computing device(s) 140. For example, an application publisher of a driving game may select the g-force around turns as application state data to send to tracking computing device(s) 140. Meanwhile, an application publisher of a first person shooter game may select the number of times a character has been shot recently as application state data to send to tracking computing device(s) 140. By allowing the application publisher to select application state data to send to tracking computing device(s) 140, tracking computing device(s) increases the customizability of the analytics produced. For example, while general game state data may be useful in determining whether a distraction occurs in relationship to an amount of time an application has been running, specified game state data can be used to determine which events that are specific to the particular game lead to a distraction.

Tracking computing device(s) 140 may perform analytics using application state data received from a plurality of computing devices. For example, tracking computing device(s) may determine the average length of time an application is executing before a distraction occurs. In the video example described above, tracking computing device(s) may identify an average number of videos or an average video length before a distraction occurs. As an application specific example, in the first person shooter game discussed above, tracking computing device(s) 140 may identify an average length of time from the last time that a character has been shot until a distraction is identified.

5. User State

In an embodiment, tracking computing device(s) 140 uses application state data to identify a user state associated with client computing device 110. A user state generally describes a particular user's focus. Tracking computing device(s) 140 may utilize data of multiple distractions from a particular client computing device to determine a particular user's propensity for distraction. For example, tracking computing device(s) 140 may determine that a first client computing device associated with a first user on average registers a distraction after displaying four videos of a thirty second length while a second client computing device associated with a second user on average registers a distraction after displaying two videos of a thirty second length.

Average application execution time and other application state data may be used to identify different types of user states. For example, in the first person shooter game states described above, game state data may include health when distracted, number of enemies when distracted, and other application publisher defined metrics. These metrics may be compared to application execution time as well as distraction data. For example, tracking computing device(s) 140 may determine that, for a first client computing device, a game session with fewer enemies per minute tends to include more distractions and/or be shorter than a game session with a greater number of enemies per minute. Alternatively, for a second client computing device, tracking computing device(s) 140 may determine that a game session with fewer enemies per minute has no effect on the length of the game session or the number of distractions. Thus, the user state for the first client computing device may be identified as distracted with too few enemies while the user state for the second client computing device may be identified as unrelated to enemy count.

The number of possible user states may vary from application to application depending on requests from the application publisher. For example, the application publisher of a video displaying application may request user states based on number of videos watched, average length of video watched, and/or overall time executing the application. The application publisher of a driving game may request user states based on number of other cars on the road, length of the track, number of turns, and/or average speed on the user's car. Each user state may indicate, for a particular user, optimal values of each metric to maximize engagement with the application, such as an optimal number of videos to play or an optimal video length. The optimal values may be computed based on average values of each metric before a distraction and/or metric values that correlate to an increase in the number of distractions or a decrease in the time spent executing the particular application.

6. Alter Application

In an embodiment, client computing device 110 alters the application based on user state information received from tracking computing device(s) 140. For example, an SDK input into the application may be configured to make one or more calls to tracking computing device(s) 140 upon execution of an application. The one or more calls may include a request for user state information for a particular user of client computing device 110. In response to receiving the request for user state information, tracking computing device(s) 140 may identify the application by application ID and placement ID. Tracking computing device(s) 140 may also identify client computing device 110 by a device identifier or a user of the device by account information which is sent with the original distraction data. Upon identifying the application and device, tracking computing device(s) 140 may send user state data to the client computing device.

In an embodiment, the client computing device is configured to alter one or more elements of the application executing on the client computing device based on user state data. For example, the video display application described above may be configured to select an optimal number of videos to display based on user state data. Thus, if user state data indicates that a user tends to become distracted after three videos, the client computing device may alter the video display application to only play three videos before switching to a different activity or otherwise engaging the user. In the example of the first person shooter game discussed above, if the user state data indicates that the user tends to become distracted if thirty seconds pass without an enemy appearing, the artificial intelligence of the game may be altered to cause an enemy to appear at least every thirty seconds.

The alterations to the application may be designated ahead of time by application publisher computing device(s) 130. For example, an application publisher may designate in a particular application that the number of enemies is changeable based on user state data. A default value may be set for the application which changes based on received user state data. As an example, a racing game may randomly select from a number of different racetracks for each race. The racing game may be configured to remove particular racetracks from the selection if user state data indicates that a user tends to become distracted more often on the particular racetracks. Additionally and/or alternatively, the game may be configured to weight each racetrack for selection based on received user state data.

By configuring the SDK to request and return state data before execution of an application, tracking computing device(s) 140 allows application publisher computing device(s) 130 to create a customizable experience for each user based on tracked focus data of the user. Additionally, tracking computing device(s) 140 may be configured to identify deviations from the user state during a particular session. For example, if user state data indicates that a distraction generally occurs after forty minutes of execution of the application, but in a particular session a distraction occurred within the first ten minutes, tracking computing device(s) 140 may identify the deviation from the user state data. Analytics may be run on the deviations to determine when deviations from stored user state data tend to occur.

7. Heat Maps and Reverse Heat Maps

In an embodiment, tracking computing device(s) 140 generates a heat map based on focus data received from a plurality of computing devices. A heat map in the present context refers to a mapping of points of focuses at particular points in an application. For example, a heat map of a video display application may show a large grouping of points of focus at the screen with a few variations away from the screen. The heat map thus depicts where a large percentage of application users tend to focus while using the virtual reality application.

In an embodiment, areas of interest are generated based on the heat maps. For example, tracking computing device(s) 140 may generate a heat map that identifies, for a particular level of a game, where high concentrations of users tend to focus. Tracking computing device(s) 140 may identify the area with high concentration as an area of interest. Tracking computing device(s) 140 may send the particular area of interest to the client computing devices. For example, an SDK input into the application may be configured to make one or more calls to tracking computing device(s) 140 to request areas of interest upon execution of the application. The client computing device may be configured to track points of focus to determine if they differ from areas of interest received from tracking computing device(s) 140. In response to determining that a point of focus differed from the received area of interest, the client computing device may send distraction data to tracking computing device(s) 140.

In an embodiment, tracking computing device(s) 140 generates a reverse heat map using distraction data received from one or more client computing devices. Where a heat map refers to a mapping of points of focuses at particular points in an application, a reverse heat map refers to a mapping of anomalies from an initial heat map or otherwise identified areas of interest. In the example of FIG. 5, a reverse heat map may indicate the percentage of users that focus on the tree, the road, the church, and/or one or more other locations of the virtual environment. By generating and storing data identifying deviations from the norm, tracking computing device(s) 140 is capable of identifying areas within an application which may be more distracting than originally intended. For example, if a particular point in the sky of FIG. 5 is featured repeatedly in the reverse heat map, it may indicate that the rendering of that portion of the sky is distracting to users of the application. Tracking computing device(s) 140 may send reverse heat map data to application publisher computing device(s) 130 to facilitate an understanding in areas of the application which are more distracting than initially intended.

8. Similar Applications

In an embodiment, tracking computing device(s) 140 compares and combines distraction and focus data from a plurality of different applications. For example, tracking computing device(s) 140 may determine that two applications are similar. Based on the determination, tracking computing device(s) 140 may use distraction data and focus data from both applications to generate areas of interest, user states, heat maps, reverse heat maps, and other analytics. By generating areas of interest and user states from similar applications, tracking computing device(s) 140 is able to send user state data and areas of interest to a client computing device for applications which have not been executed on the particular client computing device yet. Additionally, tracking computing device(s) 140 may provide data to an application publisher that compares distraction data received from a particular application with distraction data from identified similar applications.

Tracking computing device(s) 140 may determine similarity between applications based on tracked areas of interest and/or based on selected application state data from the applications. For example, two different racing games may include the road as a tracked area of interest. Based on the same tracked area of interest, tracking computing device(s) 140 may determine that the two games are similar. Thus, user state data may be created from distractions within both games. Additionally, a later executed racing game with a road as a tracked area of interest may utilize user state data based on the prior similar racing games. As another example, two applications that use number of videos played and length of videos played as application state data to be sent with distraction data may be identified as similar applications to tracking computing device(s) 140.

In an embodiment, application publisher computing device(s) 130 sends data to tracking computing device(s) 140 which allows tracking computing device(s) 140 to determine similar applications. For example, tracking computing device(s) 140 may send data to application publisher computing device(s) 130 which identifies other tracked applications. Application publisher computing device(s) 130 may select one or more of the identified tracked applications as similar to a particular application of application publisher computing device(s) 130. Additionally and/or alternatively, tracking computing device(s) 140 may provide one or more application categories to application publisher computing device(s) 130. If application publisher computing device(s) 130 selects a particular category for a particular application, tracking computing device(s) 140 may determine that each application in the particular category is similar to the particular application.

9. Distraction Score

Figure 7:
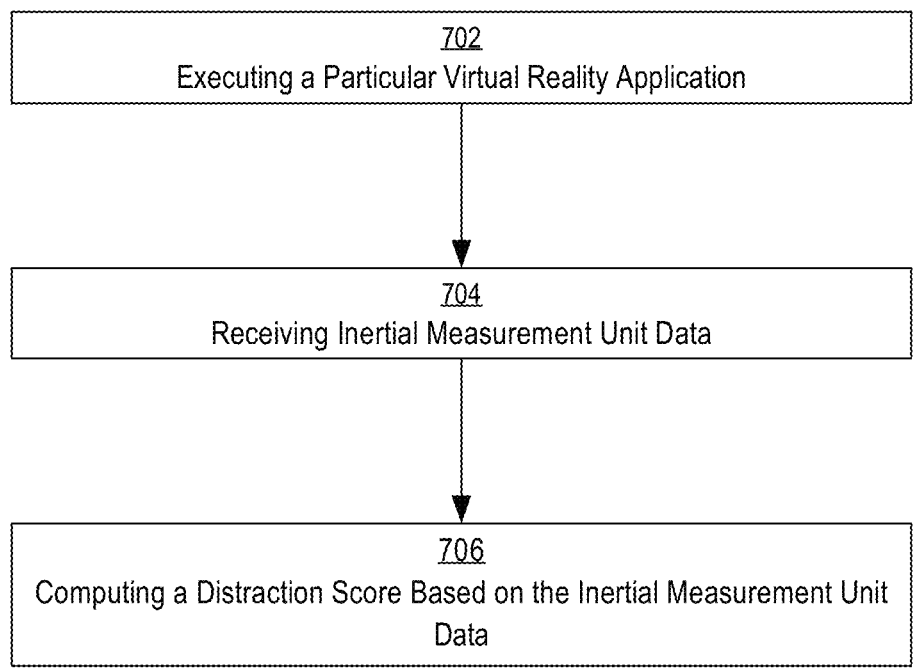
FIG. 7 illustrates a flow diagram illustrating an example method of computing a distraction score.

In an embodiment, client computing device 110 may be configured to compute a distraction score during execution of a virtual reality application. FIG. 7 illustrates a flow diagram illustrating an example method of computing a distraction score.

At step 702, a particular virtual reality application is executed. For example, a particular virtual reality application provided by application publisher computing device(s) 130 may contain instructions for computing a distraction score based on movement of the client computing device. When client computing device 110 executes the particular virtual reality application, the instructions for computing the distraction score may be initialized. Additionally and/or alternatively, the instructions for computing the distraction score may be initialized in response to one or more triggers. For example, an application publisher may be interested in distractions at specific points in the application. Application publisher computing device(s) 130 may insert the instructions for computing the distraction score into the particular virtual reality application to be executed in response to one or more triggers, such as the beginning of a particular level or section of the particular application.

At step 704, inertial measurement unit data is received. For example, client computing device 110 may comprise an inertial measurement unit comprising one or more accelerometers, gravimeters, magnetometers, gyroscopes, and/or other sensors. The inertial measurement unit may be configured to measure three dimensional acceleration, velocity, magnetic field, and/or angular rate of change. Based on the measurements, client computing device 110 may produce data describing the position, acceleration, and/or angular rate of change of client computing device 110. Inertial measurement unit data may comprise raw measurements from the sensors of the inertial measurement unit and/or data describing the position and motion of the client computing device. In an embodiment, client computing device 110 stores data identifying rotation of the client computing device during execution of the instructions for computing the distraction score. For example, client computing device 110 may compute total radians of movement of client computing device 110 over a particular period of time and/or average radians of movement of client computing device 110 over a particular period of time.

At step 706, a distraction score is computed based on the inertial measurement unit data. In an embodiment, client computing device 110 converts the computed radians of movement of client computing device 110 to a distraction score for the particular period of time. As an example, a normalized distraction score may have a range from zero, indicating total distraction, to one, indicating complete focus on a single point. As an example of generating a normalized distraction score, client computing device 110 may compute:

$$DS = C\frac{R}{T}$$

where DS is the distraction score, R/T is the average radians per time for the particular period of time, and C is a normalizing constant that reduces R/T to one at a predetermined number of radians per period of time. Client computing device 110 may identify the distraction score as one if the computation produces a value above one.

The predetermined number of radians per period of time may be stored as a maximum movement value. The maximum movement value may be set generally for all applications or may be specified by application publisher computing devices(s). Thus, if a particular application publisher has an application that requires a lot of movement, the particular application publisher may set a higher R/T value to be used as the maximum movement value. In this manner, the application publisher may customize the distraction score to a particular application.

The period of time may be a fixed period of time, such as thirty seconds, or a variable period of time customizable to either the application or point in the application. For example, for extended scenes an application publisher may be interested in the average distraction score over the entire scene instead of every ten seconds within the scene. In contrast, for points in the application that are configured with application events, the application publisher may be interested in the average distraction score each ten seconds in order to determine if an application event should be executed.

The above equation is merely an example of a computation of a distraction score based on inertial measurement unit data. Alternative equations may also be used to determine a distraction score based on movement of the client computing device. Alternative equations may include factors such as average movement of head mounted displays when executing virtual reality applications, average movement of head mounted displays when executing the particular virtual reality application, average movement of head mounted displays when executing the particular virtual reality application at a particular point of the virtual reality application, average movement of a particular head mounted display when executing other virtual reality applications, and/or average movement of the particular head mounted display when executing the particular virtual reality application.

In an embodiment, client computing device 110 sends one or more distraction scores to tracking computing device(s) 140. Client computing device 110 may send the distraction scores to tracking computing device(s) 140 periodically and/or at specific points in time. For example, client computing device 110 may send distraction scores to tracking computing device(s) 140 in response to closing the particular application. Additionally, distraction scores may be tied to specific application states as described herein. For example, client computing device 140 may send data to tracking computing device(s) identifying, for each period of time, an application state and one or more distraction scores for the period of time. Thus, tracking computing device(s) 140 may receive multiple distraction scores for different application states. This allows tracking computing device(s) 140 to generate analytics for distraction levels related to particular predefined application states.

In an embodiment, client computing device 110 uses the methods described herein to generate a distraction score based on areas of interest. For example, client computing device 110 may generate a distraction score which indicates, for a particular period of time, a percentage of the period of time in which the point of focus of the display differs from one or more areas of interest. In an embodiment, client computing device 110 generates a distraction score based on movement of the head mounted display for periods of time where an area of interest has not been identified and generates a distraction score based on areas of interest for periods of time where areas of interest have been identified.

In an embodiment, client computing device 110 executes events using the techniques described herein in response to receiving a particular distraction score. Client computing device 110 may store a distraction threshold value. If a received distraction score for a particular period is greater the distraction threshold value, client computing device 110 may execute an application event or client computing device event using the methods described herein. Additionally and/or alternatively, client computing device 110 may execute an application event or client computing device event in response to determining that the received distraction score is greater than the distraction threshold for a particular duration of time. For example, a distraction score threshold may be set at 0.5. If an average distraction score of 0.7 is identified for a fifteen second period, client computing device 110 may execute the application event or client computing device event.

In an embodiment, application publisher computing device(s) 130 select the distraction score threshold. For example, the SDK provided by tracking computing device 140 may include options for customizing the computation of the distraction score and/or for customizing the distraction threshold value. Additionally, the SDK may provide options for using different customizations for different parts of the application. For example, an application publisher may select a high distraction threshold value, i.e. a value closer to one, for sections of the application requiring a lot of head movement and a low distraction threshold value, i.e. a value closer to zero, for sections of the application requiring very little head movement. The SDK may also provide options for selecting different application events based on distraction scores. For example, an application publisher may set a first threshold value at 0.2 for a first application event and a second threshold value at 0.5 for a second, more minor application event. Thus, an application publisher may select more extreme application events for more distracted users.

10. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
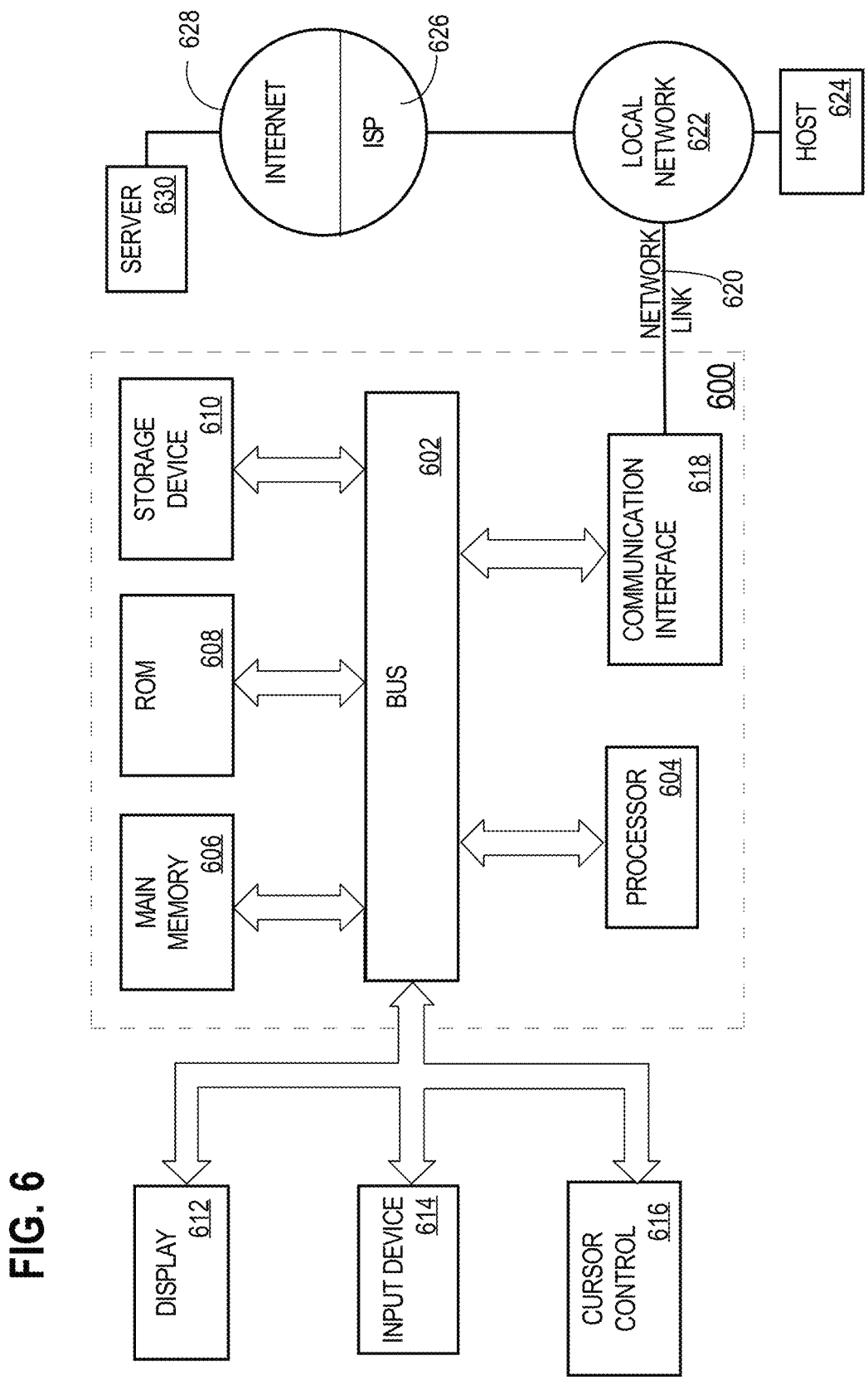
FIG. 6 is a block diagram that illustrates a computer system upon which an embodiment may be implemented.

For example, FIG. 6 is a block diagram that illustrates a computer system 600 upon which an embodiment may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method comprising:
    storing on a client computing device, with a particular digital graphical virtual reality application, digital data identifying one or more particular areas of interest within the particular digital graphical virtual reality application;
    tracking, through the particular digital graphical virtual reality application executing on the client computing device, a point of focus of a video display of the client computing device executing the particular digital graphical virtual reality application;
    determining that the point of focus of the video display of the client computing device executing the particular digital graphical virtual reality application is different than any of the one or more particular areas of interest;
    in response to the determining, causing execution of an application event through the particular digital graphical virtual reality application or a client computing device event through the client computing device, the application event comprising storing application metadata that identifies a virtual location of the client computing device in the virtual reality application.

2. The computer-implemented method of claim 1 wherein the application metadata further identifies one or more of a time within the application, one or more previous events within the application, or one or more prior actions of the particular user.

3. The computer-implemented method of claim 1, wherein the digital data identifying one or more particular areas of interest is generated automatically by a processor of a server computer from heat map data that has been received from a plurality of client computing devices and which identifies points of focus of video displays of the plurality of client computing devices.

4. The computer-implemented method of claim 1, further comprising:
    tracking the point of focus of the video display at a first point of time in a reference digital graphical virtual reality application;
    tracking the point of focus of the video display at a second point of time in the particular digital graphical virtual reality application;
    identifying the second point of time as similar to the first point of time;
    determining that the point of focus of the video display of the client computing device executing the particular digital graphical virtual reality application is different than the one or more particular areas of interest by determining that the point of focus of the video display at the second point of time is different than the point of focus of the video display at the first point of time.

5. The computer-implemented method of claim 4 wherein the reference digital graphical virtual reality application is a different application than the particular digital graphical virtual reality application.

6. The computer-implemented method of claim 1 wherein the application event comprises an audiovisual event in the particular digital graphical virtual reality application to attract the particular user to shift the point of focus to the particular area of interest.

7. The computer-implemented method of claim 1, further comprising:
    identifying a plurality of times in which the point of focus of the video display is different from a stored area of interest;
    in response to the identifying, identifying a state of a particular user associated with the client computing device;
    in response to identifying the state of the particular user, modifying execution of the particular digital graphical virtual reality application based, at least in part, on the state of the particular user.

8. The computer-implemented method of claim 1, wherein the client computing device comprises a head mounted display.

9. The computer-implemented method of claim 1, wherein the client computing device event comprises the client computing device vibrating, playing a particular sound, or altering a visual display of the client computing device.

10. The computer-implemented method of claim 1, wherein the point of focus of the video display changes based, at least in part, on the client computing device detecting motion of the client computing device.

11. A computer-implemented method comprising:
receiving, at a server computer, a particular digital graphical virtual reality application;
generating, at the server computer, instructions which, when executed by a client computing device, cause:
tracking, through the particular digital graphical virtual reality application executing on the client computing device, a point of focus of a video display of the client computing device executing the particular digital graphical virtual reality application;
sending, to the server computer, first digital data identifying the point of focus of the video display at one or more times during execution of the particular digital graphical virtual reality application;
receiving, from a plurality of client computing devices, second digital data identifying points of focus for a plurality of users of the particular digital graphical virtual reality application at the one or more times;
generating, from the second digital data, one or more heat maps for the particular digital graphical virtual reality application at the one or more times;
identifying, from the one or more heat maps, an area of interest for the particular digital graphical virtual reality application;
generating instructions which, when executed by a particular client computing device, cause:
tracking, through the particular digital graphical virtual reality application executing on the client computing device, a point of focus of a video display of the particular client computing device executing the particular digital graphical virtual reality application;
determining, at a particular time of the one or more times, that the point of focus of the video display is different from the area of interest;
in response to determining, causing execution of an application event through the particular digital graphical virtual reality application or a client computing device event through the client computing device.

12. The computer-implemented method of claim 11, further comprising:
receiving, at the server computer, second digital data identifying an area of interest for the particular digital graphical virtual reality application;
wherein the instructions which, when executed by a client computing device, further cause:
determining that, at the one or more times during execution of the particular digital graphical virtual reality application, the point of focus of the video display is different than the area of interest for the particular digital graphical virtual reality application;
sending, to the server computer, the first digital data in response to the determining.

13. The computer-implemented method of claim 12, further comprising:
receiving, at the server computer, along with the first digital data, third digital data identifying an application state of the particular digital graphical virtual reality application at the one or more times;
determining, based, at least in part, on the third digital data, a state of a particular user associated with the client computing device.

14. The computer-implemented method of claim 13, wherein the application state comprises one or more of a virtual location of the video display, a time within the application, one or more previous events within the application, or one or more prior actions of a user within the particular digital graphical virtual reality application.

15. The computer-implemented method of claim 12, further comprising:
receiving, from a plurality of client computing devices, third digital data identifying points of focus for a plurality of users of the particular digital graphical virtual reality application at the one or more times;
generating, based on the third digital data, a reverse heat map identifying variations of points of focus from the area of interest.

16. The computer-implemented method of claim 11, further comprising:
receiving, at the server computer, second digital data identifying an area of interest for the particular digital graphical virtual reality application;
receiving, at the server computer from a plurality of client computing devices, third digital data identifying points of focus of video displays of the plurality of client computing devices executing the particular digital graphical virtual reality application;
computing, based on the second digital data and the third digital data, a relative length of focus on the area of interest of the video displays of the plurality of client computing devices executing the particular digital graphical virtual reality application.

17. A head mounted display system comprising:
a memory;
an inertial measurement unit configured to measure movement of the head mounted display system;
one or more processors communicatively coupled to the memory and configured to execute one or more instructions to cause the head mounted display system to perform:
executing, on the head mounted display system, a particular virtual reality application;
while executing the particular virtual reality application, receiving inertial measurement unit data from the inertial measurement unit;
based on the inertial measurement unit data, computing a distraction score;
storing, in the memory, a distraction score threshold;
determining that the computed distraction score at a particular time is greater than the distraction score threshold and, in response, storing application metadata that identifies a virtual location of the client computing device in the virtual reality application.

18. The head mounted display system of claim 17, wherein the one or more processors are further configured to perform:

computing, from the inertial measurement unit data, for a particular period of time, a rotation value indicating radians of movement of the head mounted display system over the particular period of time;

computing the distraction score by normalizing the rotation value for the particular period of time.

\* \* \* \* \*